United States Patent
Byagowi et al.

(10) Patent No.: US 11,828,936 B1
(45) Date of Patent: *Nov. 28, 2023

(54) LIGHT FIELD DISPLAY TILTING

(71) Applicant: META PLATFORMS TECHNOLOGIES, LLC, Menlo Park, CA (US)

(72) Inventors: Ahmad Byagowi, Fremont, CA (US); Ramesh Raskar, Palo Alto, CA (US); Andrew Hamilton Coward, Menlo Park, CA (US); Ethan Kroll Gordon, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,238

(22) Filed: Oct. 25, 2021

Related U.S. Application Data

(63) Continuation of application No. 16/028,382, filed on Jul. 5, 2018, now Pat. No. 11,156,828.

(51) Int. Cl.
  *G02B 27/00* (2006.01)
  *G09G 5/38* (2006.01)
  *G02B 3/00* (2006.01)
  *G02B 27/01* (2006.01)

(52) U.S. Cl.
  CPC ....... *G02B 27/0068* (2013.01); *G02B 3/0056* (2013.01); *G02B 27/0176* (2013.01); *G09G 5/38* (2013.01); *G02B 27/01* (2013.01); *G02B 27/017* (2013.01); *G02B 27/0179* (2013.01); *G02B 2027/0154* (2013.01); *G02B 2027/0178* (2013.01)

(58) Field of Classification Search
  CPC .. G02B 27/01; G02B 27/0068; G02B 27/017; G02B 27/0176; G02B 27/0179; G02B 2027/0154; G02B 2027/0178; G02B 3/0056; G09G 5/38
  USPC ................................................ 345/8, 31, 32
  See application file for complete search history.

(56) References Cited

U.S. PATENT DOCUMENTS

| | | | |
|---|---|---|---|
| 5,612,814 A * | 3/1997 | Yang | G02B 26/0858 359/224.1 |
| 10,197,808 B2 | 2/2019 | Du et al. | |
| 10,228,565 B1 | 3/2019 | Saarikko | |
| 10,440,354 B2 | 10/2019 | Du et al. | |
| 11,156,828 B1 * | 10/2021 | Byagowi | G02B 27/0176 |
| 2008/0239499 A1 | 10/2008 | Fukuda | |
| 2017/0195660 A1 | 7/2017 | Du et al. | |
| 2017/0208314 A1 | 7/2017 | Du et al. | |
| 2017/0208317 A1 | 7/2017 | Du et al. | |

\* cited by examiner

*Primary Examiner* — Jason M Mandeville
(74) *Attorney, Agent, or Firm* — BakerHostetler

(57) ABSTRACT

One embodiment of the present application sets forth a wearable device that includes a display comprising a plurality of pixels and configured to emit light, and a micro-lens array located adjacent to the display, and configured to produce a light field by altering the light emitted by the display, where at least one of the display or the micro-lens array is configured to move from a first position to a second position that aligns a first pixel in the plurality of pixels relative to the micro-lens array.

11 Claims, 8 Drawing Sheets

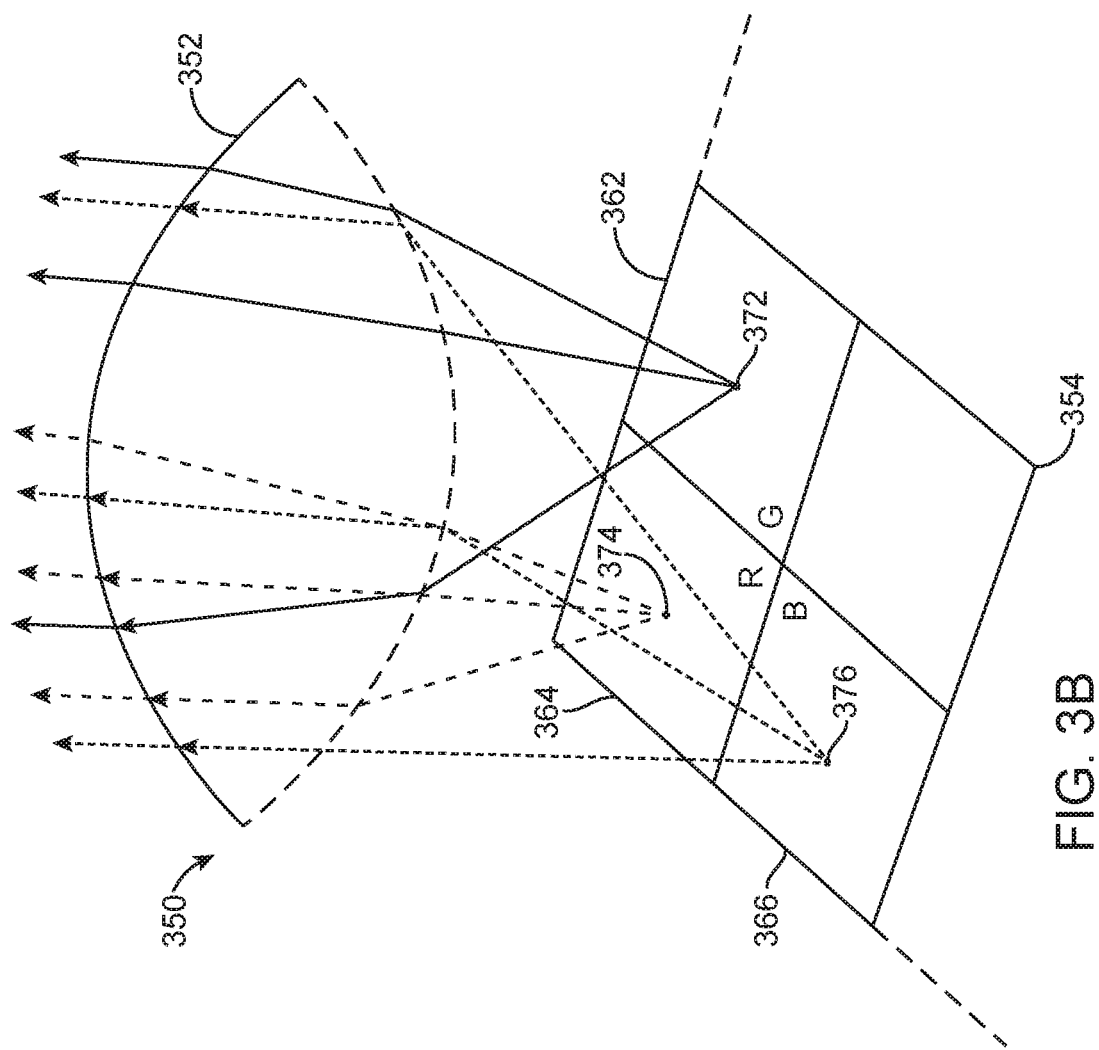
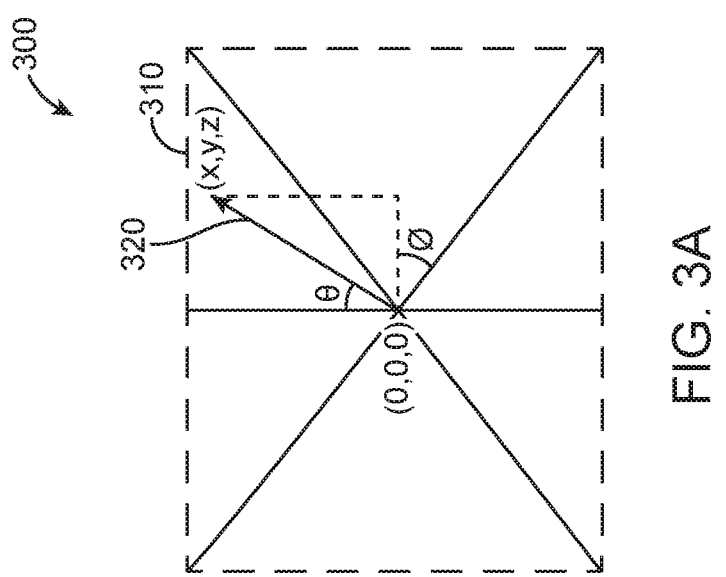
FIG. 3B
FIG. 3A

LIGHT FIELD DISPLAY TILTING

CROSS-REFERENCE TO RELATED APPLICATION

This application is a continuation of the co-pending U.S. patent application titled, "LIGHT FIELD DISPLAY TILTING," filed on Jul. 5, 2018 and having Ser. No. 16/028,382. The subject matter of this related application is hereby incorporated herein by reference.

BACKGROUND

Field of the Various Embodiments

Embodiments of the present disclosure relate generally to video displays, head-mounted displays and, more specifically, to light field display tilting.

Description of the Related Art

A light field display is a type of display that is capable of emitting multiple individual light rays toward different direction per every pixel. Each individual light ray is emitted from a pixel in a display, propagates through the lens assembly, and reaches a user's eye. Based on the configuration of the display and the micro-lens array, a light field is created in front of a user's eye that reproduces a frame of an image.

When the light field is produced, each of the individual light rays arrives at the light field in front of the user's eye with different colors and intensities based on the perceiving angle. In some circumstances, however, a light field display may not be able to produce a light field at the user's eye with the target parameters for individual light rays. Such deviations from the target parameters may lead to distortions in the image created using the light field.

SUMMARY

One embodiment of the present application sets forth a wearable device that includes a display comprising a plurality of pixels and configured to emit light, and a micro-lens array located adjacent to the display, and configured to produce a light field by altering the light emitted by the display, where at least one of the display or the micro-lens array is configured to move from a first position to a second position that aligns a first pixel in the plurality of pixels relative to the micro-lens array.

At least one advantage of the disclosed embodiments is that the composite display system generates a light field in front of the user's eyes that includes reduced distortions due to deviations in the angles that light rays flow through the light field.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3A illustrates a light ray emitted from a plane of a light field, according to various embodiments of the present disclosure.

FIG. 3B illustrates a micro-pixel array emitting light rays through a micro-lens, according to various embodiments of the present disclosure.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
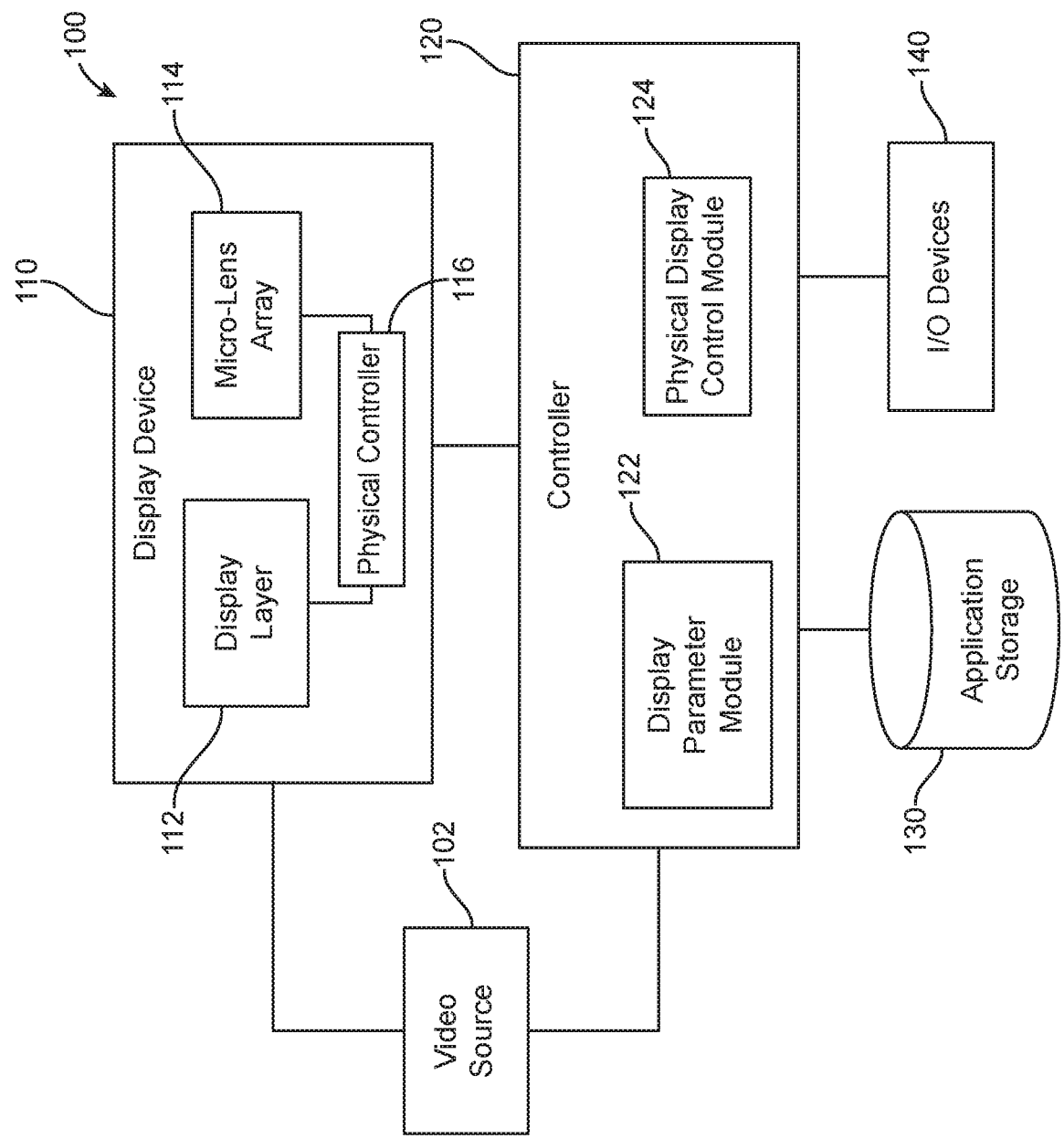
FIG. 1 illustrates a composite display system configured to implement one or more aspects of the present disclosure.

FIG. 1 illustrates a composite display system configured to implement one or more aspects of the present disclosure. Composite display system 100 includes video source 102, display device 110, controller 120, application storage 130, and input/output (I/O) device(s) 140.

In various embodiments, composite display system 100 emits light rays to generate a light field, where the light rays form an image representing a video frame provided by video source 102. During operation, video source 102 provides a video frame to controller 120 and/or display device 110 as a video signal. Controller 120 receives the video signal from video source 102 and generates control signals for display device 110 to produce the video frame. In some embodiments, controller 120 generates multiple control signals for display device 110 to generate the video frame. These control signals include, without limitation, one or more physical control signals transmitted to physical controller 116 and/or one or more pixel display control signals transmitted to display layer 112.

In some embodiments, one or more components of composite display system 100 may be included within or may be otherwise associated with a near-eye display (NED). In some embodiments, one or more components of composite display system 100 may be included in a separate device that is coupled to the NED and/or communicates with the NED. For example, one or more of video source 102, controller 120, application storage 130, and/or I/O devices 140 may be included in a device that communicates with the NED.

Video source 102 generates one or more video signals to be delivered to the user via display device 110. In some embodiments, video source 102 sends video signals to controller 120 to control display device 110 based on the video signals. In some embodiments, an application included in application storage 130 may generate content by generating video data. When the application generates video data, the application may control video source 102 to output one or more specific video signals to display device 110 and/or controller 120. In some embodiments, the application may control video source 102 to output one or more video signals in response to a user request.

In some embodiments, video source 102 generates an electrical signal that display device 110 reproduces by emitting multiple light rays to produce an image at a light field in front of the user's eyes. The light rays generated by display layer 112 included in display device 110 have one or more properties corresponding to the electrical signal. For example, the light rays generated may include color properties corresponding to the color properties included in the electrical signal. In some embodiments, the light rays may reflect other properties included in the electrical signal, such as radiance (or related properties, including luminance and/or chrominance).

Controller 120 includes display parameter module 122 and physical display control module 124. Controller 120 receives the video signal from video source 102 and controls display device 110 to emit light rays that produce the light field in front of the user's eye. In order to control the light field produced, controller 120 drives physical controller 116 and/or display layer 114 with control signals. The physical controller 116 and/or display device 112 respond to the control signals to generate the light field such that the light field reproduces the image provided by video source 102.

Display parameter module 122 receives a video signal from video source 102 and determines one or more display parameters for display device 110 to reproduce the image as a light field. Display parameter module 122 determines characteristic parameters for individual light rays that flow through the light field. In some embodiments, display parameter module 122 may compute multiple sets of characteristic parameters for an image included in the video signal. The sets of characteristic parameters specify characteristic parameters for one or more light rays in as emitted by display layer 112 and/or refracted by micro-lens array 112.

In some embodiments, the characteristic parameters of a light ray include one or more physical properties of a light ray. In such instances, the characteristic parameters include the amplitude, wavelength, and frequency of the light ray. In some embodiments, the amplitude of the light ray may correspond to the radiance of the light ray. In some embodiments, the characteristic parameters of a light ray include one or more angles that the light ray propagates relative to an axis.

The sets of characteristic parameters generated by display parameter module 122 includes a display set of characteristic parameters corresponding to light ray characteristic parameters that flow through the light field in front of the user's eye to reproduce the image provided by video source 102. The sets of characteristic parameters also include an emission set of characteristic parameters corresponding to the characteristic parameters of the light rays emitted by pixels included in display layer 112. In some embodiments, display parameter module 122 may compute the emission set of characteristic parameters based on the display set of characteristic parameters.

Physical display control module 124 receives sets of characteristic parameters from display parameter module 122 and produces physical control signals to cause physical controller 116 to physically move display layer 112 and/or micro-lens array 114 to a specified configuration. In some embodiments, physical display control module 124 determines the relative positions of display layer 112 and micro-lens array 114 such that light rays reach the light field in front of the user's eye with characteristics corresponding to the display set of characteristic parameters. In some embodiments, physical display control module 124 may determine multiple configurations within a defined period. In such instances, physical display control module 124 may generate multiple physical control signals that cause physical controller 116 to physically move display layer 112 and/or micro-lens array 114 to different configurations within the defined period.

Display device 110 includes display layer 112, micro-lens array 114, and physical controller 116. During operation, display device 110 generates an image by causing pixels in display layer 112 to emit light rays. Each of the light rays propagates through space and through micro-lens array 114. A target subset of the light rays emitted from the pixels in display layer 112 propagates through the light field and reaches the eye of the user. At a point in front of the user's eye, the light rays reproduce an image as a light field. The light field produced by display device 110 reproduces the image provided by video source 102. In some embodiments, each of the light rays flows through the light field with characteristic parameters, such as radiance and incidence angle that correspond to characteristic parameters computed by display parameter module 122 included in controller 120.

In some embodiments, display device 110 may use physical controller 116 to physically move one or both of display layer 112 and/or micro-lens array 114 to position the layer 112 and the array 114 in a relative configuration that aligns one or more pixels included in display layer 112 with one or more micro-lenses included in micro-lens array 114. Based on the relative positions of display layer 112 and micro-lens array 114, a pixel included in display layer 112 aligns with a micro-lens included in micro-lens array 114 such that the micro-lens refracts a light ray flowing through the micro-lens from a first angle (micro-lens incidence angle) to a second angle (micro-lens refraction angle). In some embodiments, the micro-lens refraction angle corresponds to a characteristic parameter of the light ray as the light ray flows through the light field to reproduce the image.

Display layer 112 ("pixel display") displays two-dimensional or three-dimensional images to the user in accordance with pixel data received from video source 102 and/or controller 120. In some embodiments, display layer 112 comprises a single or multiple displays. In some embodiments, display layer may comprise a liquid crystal display (LCD), an organic light-emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 125 and used separately, in parallel, and/or in combination.

Micro-lens array 114 is a set of micro-lenses along a common plane. In some embodiments, micro-lens array 114 may allow certain light rays to refract towards the user's eye and refract other light rays away from the user's eye.

Physical controller 116 includes one or more actuators, such as one or more microelectromechanical systems (MEMS), that respond to one or more electrical physical control signals by physically moving portions of display layer 112 and/or micro-lens array 114 to specified positions. In some embodiments, physical controller 116 may include one or more actuators configured to bend and/or tilt a portion of display layer 112 and and/or micro-lens array 114 to positions corresponding to a configuration specified by controller 120. In some embodiments, physical controller 116 may periodically cycle through multiple configurations within a defined period (for example, a period of 20 ms). In such instances, display device 110 may generate a video frame by causing different subsets of pixels to emit light rays in each of the multiple configurations such that the entire group of pixels emits light within the defined period.

Application storage 130 stores one or more applications for execution by a processor (not shown). An application is a group of instructions, that, when executed by the processor, generates content for presentation to the user. Content generated by an application may be in response to inputs received from the user via movement of display device 110 and/or input signals received via I/O devices 140. Examples of applications include gaming applications, conferencing applications, video playback applications, and/or other suitable applications.

Input/output (I/O) devices 140 are coupled to controller 120. In some embodiments, I/O devices 140 may include devices capable of receiving one or more inputs, including a keyboard, mouse, input tablet, camera, and/or other devices that interface with a user. In some embodiments, I/O devices 140 may also include devices capable of providing one or more outputs, such as an additional display, a speaker, and/or a haptic feedback device. In some embodiments, I/O devices 140 may also include devices capable of both receiving inputs and providing outputs, such as a touchscreen and a universal serial bus (USB) port. I/O devices 140 may be configured to receive various types of inputs from a user of composite display system 100. I/O devices 140 may also be configured provide various types of output to the user of composite display system 100.

Figure 2:
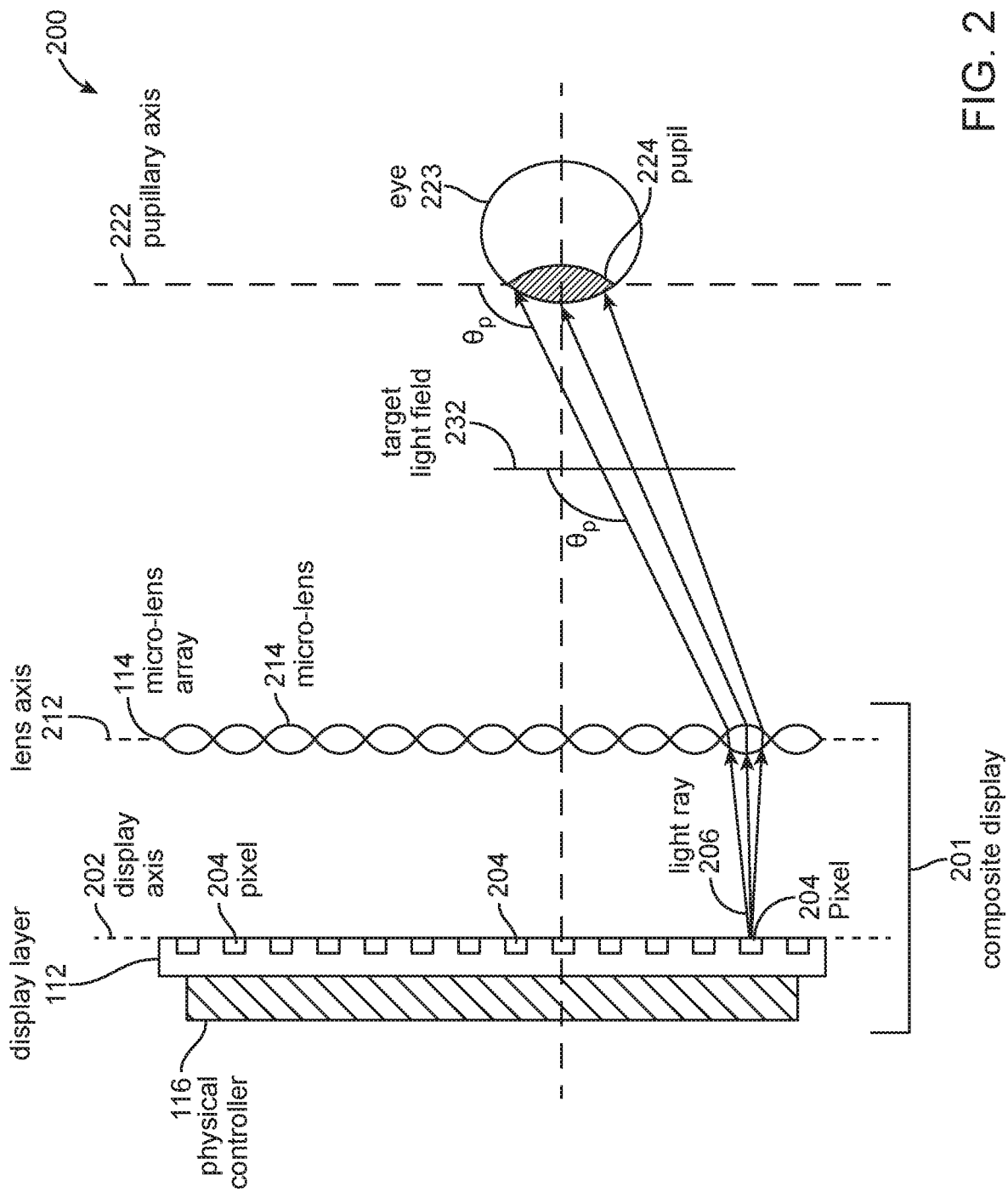
FIG. 2 illustrates a cross-section of a composite display system of FIG. 1, according to various embodiments of the present disclosure.

FIG. 2 illustrates a cross-section 200 of composite display system 100 of FIG. 1, according to various embodiments of the present disclosure. Cross-section 200 includes composite display 201. During operation, one or more pixels 204 included in display layer 112 emit light rays 206 that propagate from pixels 204 through micro-lens array 114 and reach a user's eye 223, converging at target light field 232 in front of the user's eye 223. At target light field 232, the light rays 206 have parameters corresponding to the set of display characteristic parameters computed by display parameter module 122 that reproduce the image provided by video source 102.

Composite display 201 includes display layer 112, physical controller 116, and micro-lens array 114. In some embodiments, display layer 112 may include multiple layers of pixels. In some embodiments, micro-lens array 114 may include multiple layers of micro-lenses. During operation, the components of composite display 201 cause a light ray 206 emitted from display layer 112 to reach the user's eye 223 with specified characteristic parameters, including a specified radiance and incidence angle. In some embodiments, physical controller 116 may physically move one or more portions of display layer 112 and/or micro-lens array 114 such that target light field 232 has light rays 206 flow through the light field with the specified characteristic parameters.

Pixel 204 is included in display layer 112 and emits light via one or more light rays 206. Display layer 116 includes a plurality of pixels 204, where the resolution of display device 110 is associated with the number of pixels 204 included in display layer 112. In some embodiments, pixel 204 may emit light isotropically and one or more micro-lenses 214 included in micro-lens array 114 may align one or more of the light rays to propagate anisotroically towards target light field 232. In some embodiments, pixel 204 may comprise a super pixel that includes a plurality of micro-pixels. In some embodiments, controller 120 may cause one or more of the micro-pixels included in pixel 204 to emit light rays with different characteristics, where the light rays combine within a defined period to represent one point of light in target light field 232 during the defined period.

Micro-lens 214 is included in micro-lens array 114 and refracts and/or reflects light rays 206 as the light rays flow through the micro-lens 214. In some embodiments, micro-lens 214 may be included on multiple planes that comprise micro-lens array 114. In some embodiments, micro-lens 214 aligns with one or more pixels 204 to modify the angle that light ray 206 propagates within display device 110. In some embodiments, micro-lens refracts the light ray from propagating at an emission angle (as specified in the emission set of characteristic parameters) to a refraction angle (corresponding to the incidence angle specified in the display set of characteristic parameters). In some embodiments, physical controller 116 may physically move one or more of micro-lenses 214 to modify the alignment and angle of alignment of a pixel 204 to a micro-lens 214.

Eye 223 is one eye of a user, having a pupil that receives light rays 206 emitted from display layer 112. The light rays 206 flowing through target light field 232 reach pupil 224 at the same incidence angle relative to pupillary axis 222 as the incidence angle relative to the axis of target light field 232. As a result, the light rays 206 reach pupil 224 with the same characteristic parameters as when the light rays 206 flow through target light field 232. In some embodiments, a portion of the light rays 206 flowing through target light field 232 reach pupil 224 of a user's first eye, while a separate portion of the light rays 206 flowing through target light field 232 reach pupil 224 of a user's second eye.

Target light field 232 is a plane between micro-lens array 114 and eye 223 of the user. Light rays flow through target light field 232 to generate the light field that reproduces the image provided by the video signal. Controller 120 causes display device 110 to emit light rays 206 from display layer 112 and through micro-lens array 114 to reproduce an image as provided by video source 102. In some embodiments, different light rays 206 flow through target light field 232 within a specified time. When this specified time is short (e.g., under 100 ms), the eye 223 sees the individual light rays 206 as flowing through target light field 232 simultaneously. In some embodiments, target light field 232 has dimensions corresponding to the dimensions of the display layer 112.

FIG. 3A illustrates a light ray 320 emitted from a plane of a light field, according to various embodiments of the present disclosure. As shown, three-dimensional space 300 includes a planar surface 310 and a light ray 320.

Light ray 320 is associated with multiple parameters as light ray 320 flows through plane surface 310. One such parameter is the radiance of the light field, which correlates with the amplitude of the light ray 320. In some embodiments, the radiance of the light ray 320 is a measure of the amount of light flowing through plane surface 310 and the frequency of the light ray. In such instances, the color of the light ray is determined by the frequency parameter associated with the light ray.

In some embodiments, light ray 320 includes one or more angles as characteristic parameters that reflect the direction of the light ray 320 as the light ray 320 propagates through space. In some embodiments, a single angle φ may include a set of angles {θ, φ, ψ} that define how light ray 320 propagates relative to a specific axis.

FIG. 3B illustrates a micro-pixel array emitting light rays through a micro-lens, according to various embodiments of the present disclosure.

Three-dimensional space 350 includes a micro-lens 352 and a micro-pixel array 354. In some embodiments, pixel 204 comprises a micro-pixel array 354. Micro-pixel array 354 includes multiple micro-pixels 362, 364, 366. In some embodiments, each of micro-pixels 362, 364, 366 may correspond to a specific color (e.g., red, green, or blue). When the micro-pixel 362, 364, and 366 emit respective light rays 372, 374, 376, the light rays 372, 374, 376 has a characteristic frequency corresponding to a frequency in the visible light spectrum that a user sees for the respective color. For example, micro-pixel 362 may emit light rays with characteristic frequencies between 526-606 THz.

In some embodiments, display device 110 may cause two or more micro-pixels 362, 364, 366 to emit light rays within a specified period. In such instances, when the specified period is short, a user may combine the separate light rays 372, 374, 376 to be perceived as a single point of light. When the user combines the separate light rays 372, 374, 376, the combined point of light mixes the colors of the light rays such that the point of light is perceived as a single color. Controller 120 may control micro-pixel array 354 emitting two or more light rays 372, 374, 376 in order to produce a broad spectrum of colors in order to reproduce the image received from video source 102.

Figure 4:
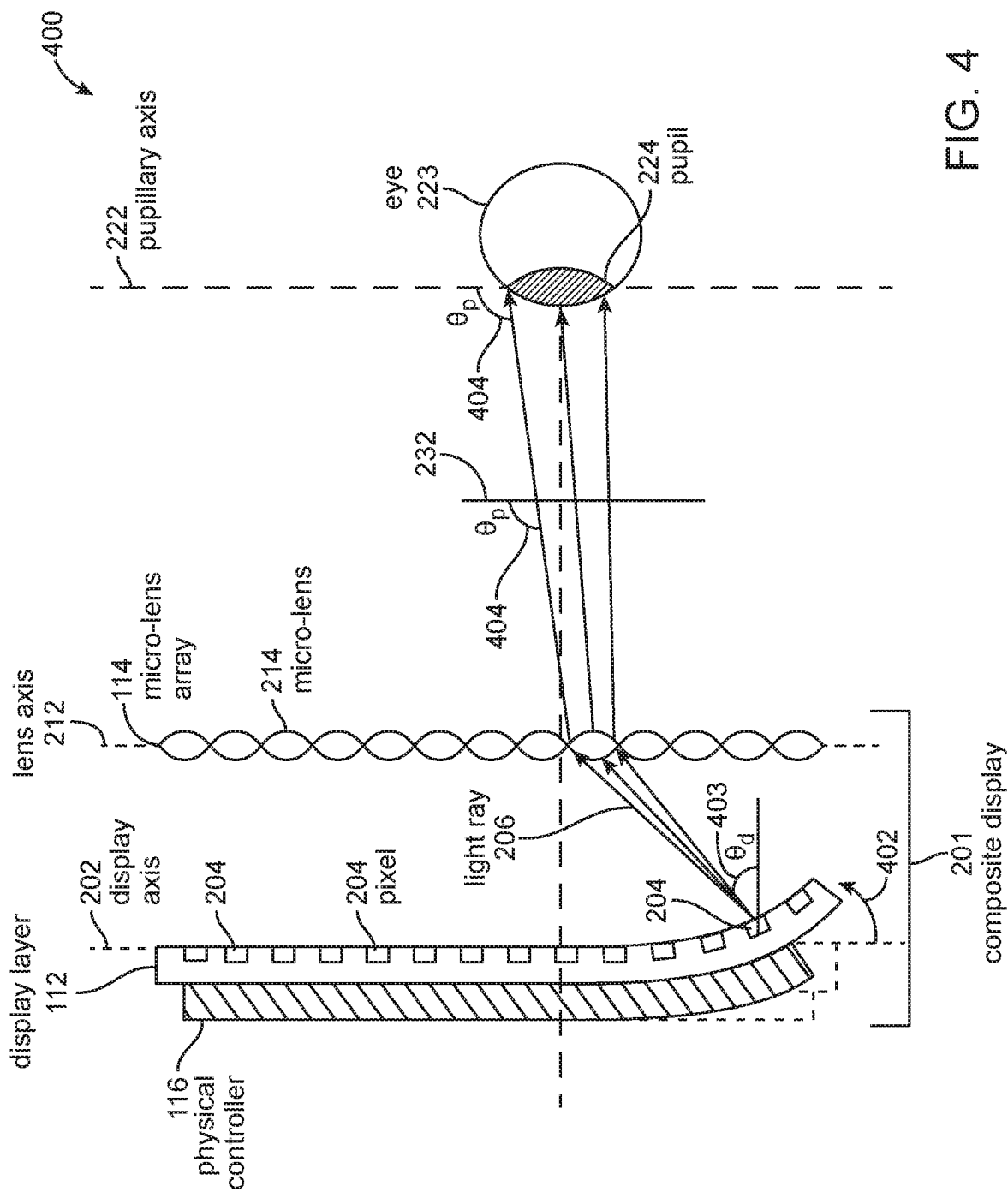
FIG. 4 illustrates a cross-section of another composite display system of FIG. 1, according to various embodiments of the present disclosure.

FIG. 4 illustrates a cross-section 400 of another composite display system 100 of FIG. 1, according to various embodiments of the present disclosure. In cross-section 400, physical controller 116 bends display layer 112 by physically moving a portion of display layer 112 using a bending movement 402. Due to bending movement 402, pixels 204 in display layer 112 align with different micro-lenses 214 in micro-lens array 114.

Physical controller 116 may respond to a physical control signal received from controller 120 by performing bending movement 402 to physically move a portion of display layer 112 away from display axis 202. In some embodiments, physical controller 116 may tilt and/or bend portions of micro-lens array 114 after performing the bending motion 402 on display layer 112.

In some embodiments, pixel 204 is aligned with a different micro-lens 214 such that, when pixel 204 emits a light ray 206 with an emission angle 403 relative to the pixel 204, light ray 206 propagates through display device 110 to a different micro-lens. The micro-lens 214 then refracts the light ray 206 to a different angle so that when light ray 206 flows through target light field 232, the light ray 206 has a different incidence angle 404.

In some embodiments, controller 120 may determine the incidence angle 404 as a specified characteristic parameter of a light ray in order to reproduce an image. Based on the incidence angle, controller 120 may implement physical display control module 124 to determine the relative positions of display layer 112 and/or micro-lens array 114 necessary for light ray 206 to flow through target light field 232 at the specified incidence angle. Upon determining the relative positions required for display layer 112 to emit a light ray 206 that has the specified display characteristic parameters, physical display control module 124 generates physical control signals to cause physical controller 116 to physically move display layer 112 and/or micro-lens array 114 to the specified relative positions. When composite display 201 is at the specified configuration via bending movement 402, display layer 112 causes pixel 203 to emit light ray 206.

Figure 5:
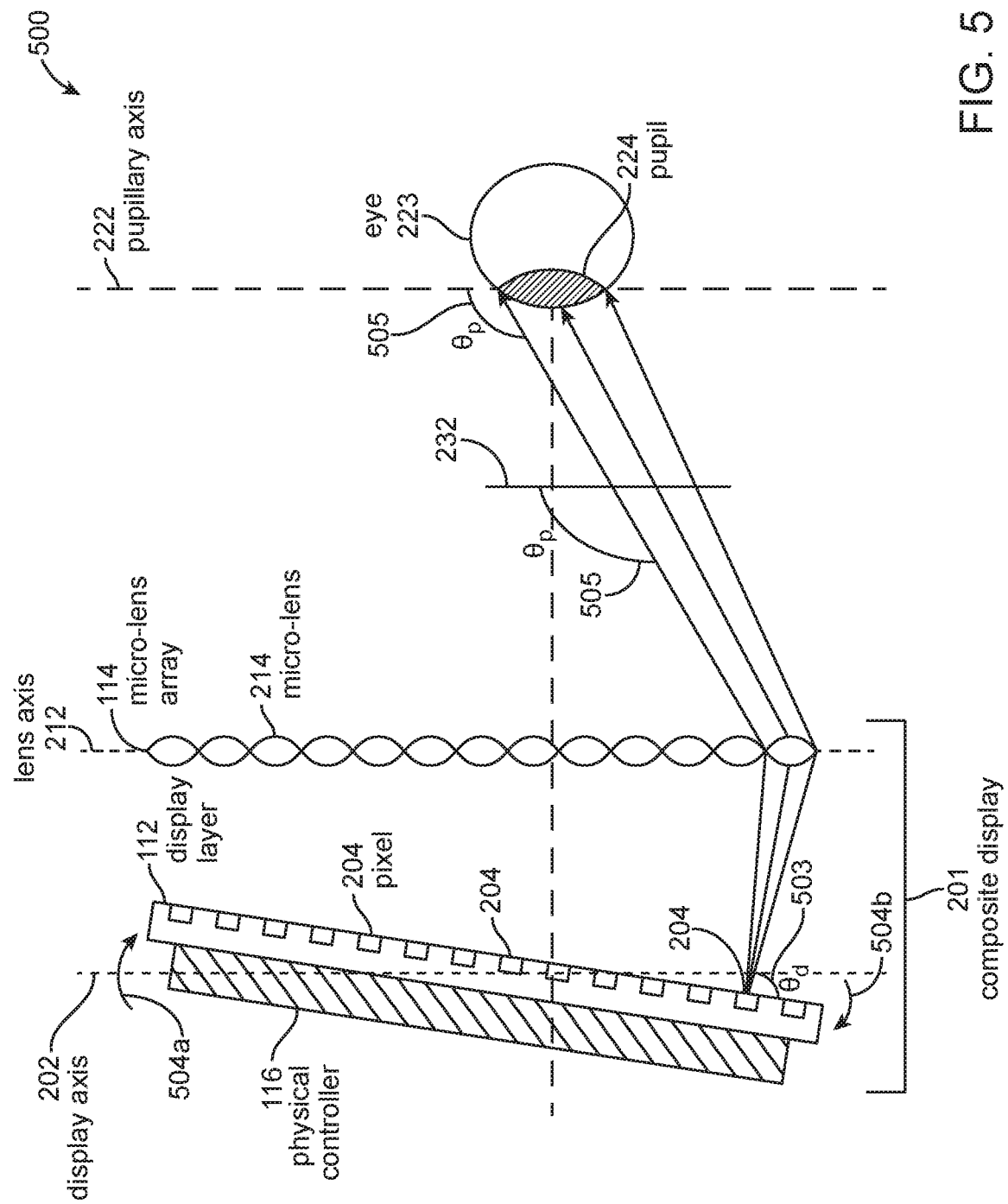
FIG. 5 illustrates a cross-section of another composite display system of FIG. 1, according to various embodiments of the present disclosure.

FIG. 5 illustrates a cross-section 500 of another composite display system 100 of FIG. 1, according to various embodiments of the present disclosure. Cross-section 500 is similar to cross-section 400, where physical controller 116 physically moves display layer 112 using tilting movements 504a-504b. Due to tilting movements 504a-504b, pixels 204 in display layer 112 align with different micro-lenses 214 in micro-lens array 114.

Physical controller 116 may respond to a physical control signal received from controller 120 by performing a bending movement to physically move a portion of display layer 112 away from display axis 202. In some embodiments, physical controller 116 may tilt and/or bend portions of micro-lens array 114 after performing the bending motion 402 on display layer 112. Due to the new alignment of display layer 112 and micro-lens array 114, micro-lens 214 refracts light ray 206 to an angle so that when light ray 206 flows through target light field 232, light ray 206 has incidence angle 505.

In some embodiments, upon determining the relative positions required for display layer 112 to emit a light ray 206 that has specified display characteristic parameters determined by controller 120, physical display control module 124 generates physical control signals to cause physical controller 116 to physically move display layer 112 and/or micro-lens array 114 to the specified relative positions. When composite display 201 is at the specified configuration via tilting movements 504a-504b, display layer 112 causes pixel 203 to emit light ray 206.

Figure 6:
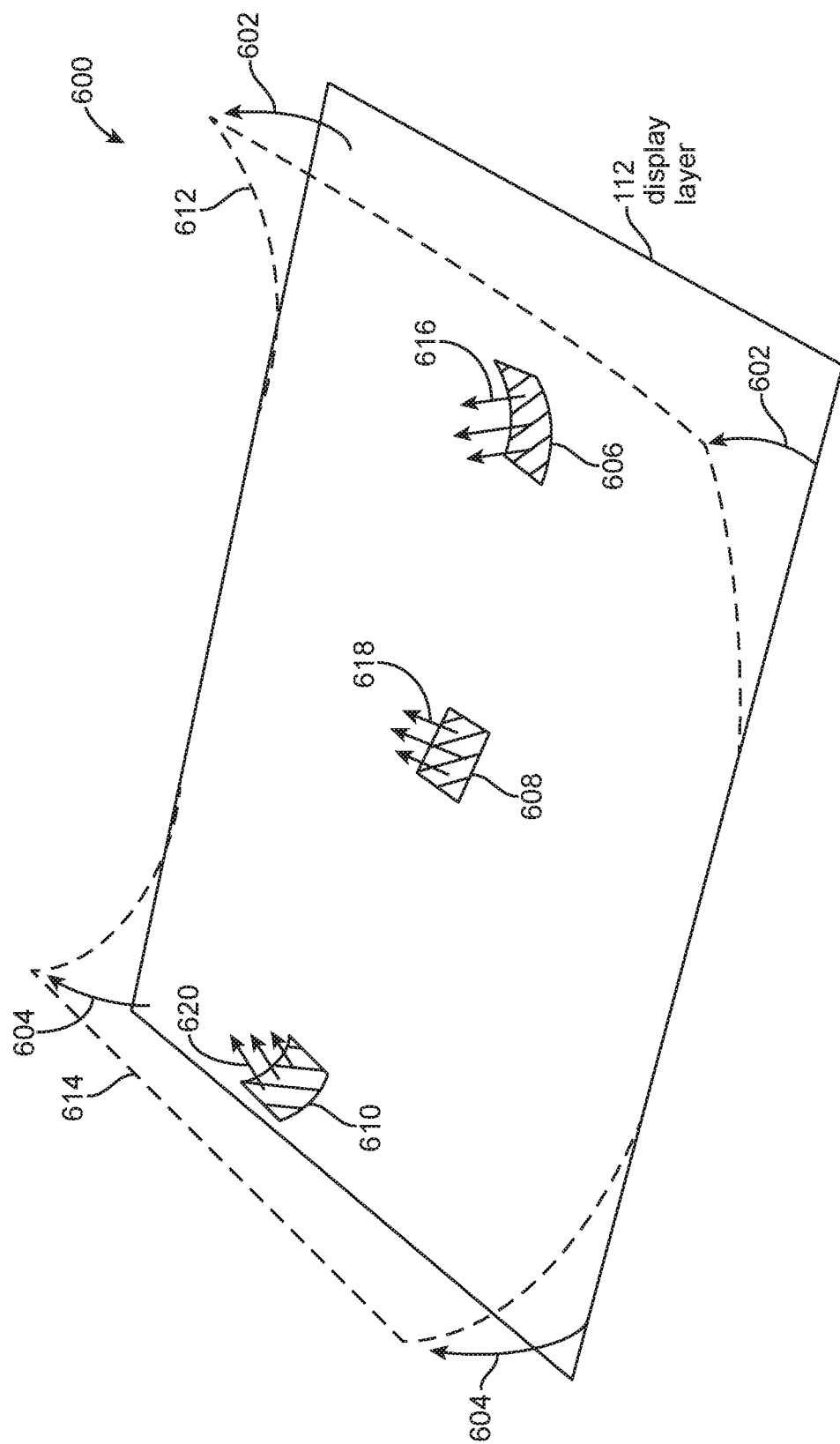
FIG. 6 illustrates a display included in a composite display system of FIG. 1, according to various embodiments of the present disclosure.

FIG. 6 illustrates a display 600 included in a composite display system 100 of FIG. 1, according to various embodiments of the present disclosure. Display 600 includes display layer 112 as display layer bends to bending positions 612, 614 within a specified period.

In some embodiments, physical controller 116 may cause display layer 112 to perform bending movement 602 to move a portion of display layer 112 to bending position 612. Physical controller 116 may also cause display layer 112 to perform bending movement 604 to move a portion of display layer 112 to bending position 614. In some embodiments, portions of display layer 112 may be physically moved to bending positions 612, 614 simultaneously.

Display layer 112 includes multiple frame portions 606, 608, 610. Each frame portion 606, 608, 610 includes multiple pixels 204 and/or micro-pixel arrays 354. During operation, subsets of the entire group of pixels included in display layer 112 may emit light rays at different times.

For example, physical controller 116 may begin a specified period with display layer 112 flat during an initial time $t_0$. During the initial time, controller 120 may cause pixels within frame portion 608 to emit a set of light rays 618. Physical controller 116 may then perform bending movement 602 to physically move a portion of move display layer 112 to bending position 612 at a first time $t_1$. During the first time, controller 120 may cause pixels within frame portion 606 to emit a set of light rays 616. Based on the bending position 612, the set of light rays 616 propagate through display device 110 at a different angle than the set of light rays 618 propagating from frame portion 608. Physical controller 116 may then perform bending movement 604 to physically move a portion of move display layer 112 to bending position 614 at a second time $t_2$. During second time, controller 120 may cause pixels within frame portion 610 to emit a set of light rays 620. Based on the bending position 614, the set of light rays 620 propagate through display device 110 at a different angle than the set of light rays 616, 618 propagating from frame portions 606, 608.

Figure 7:
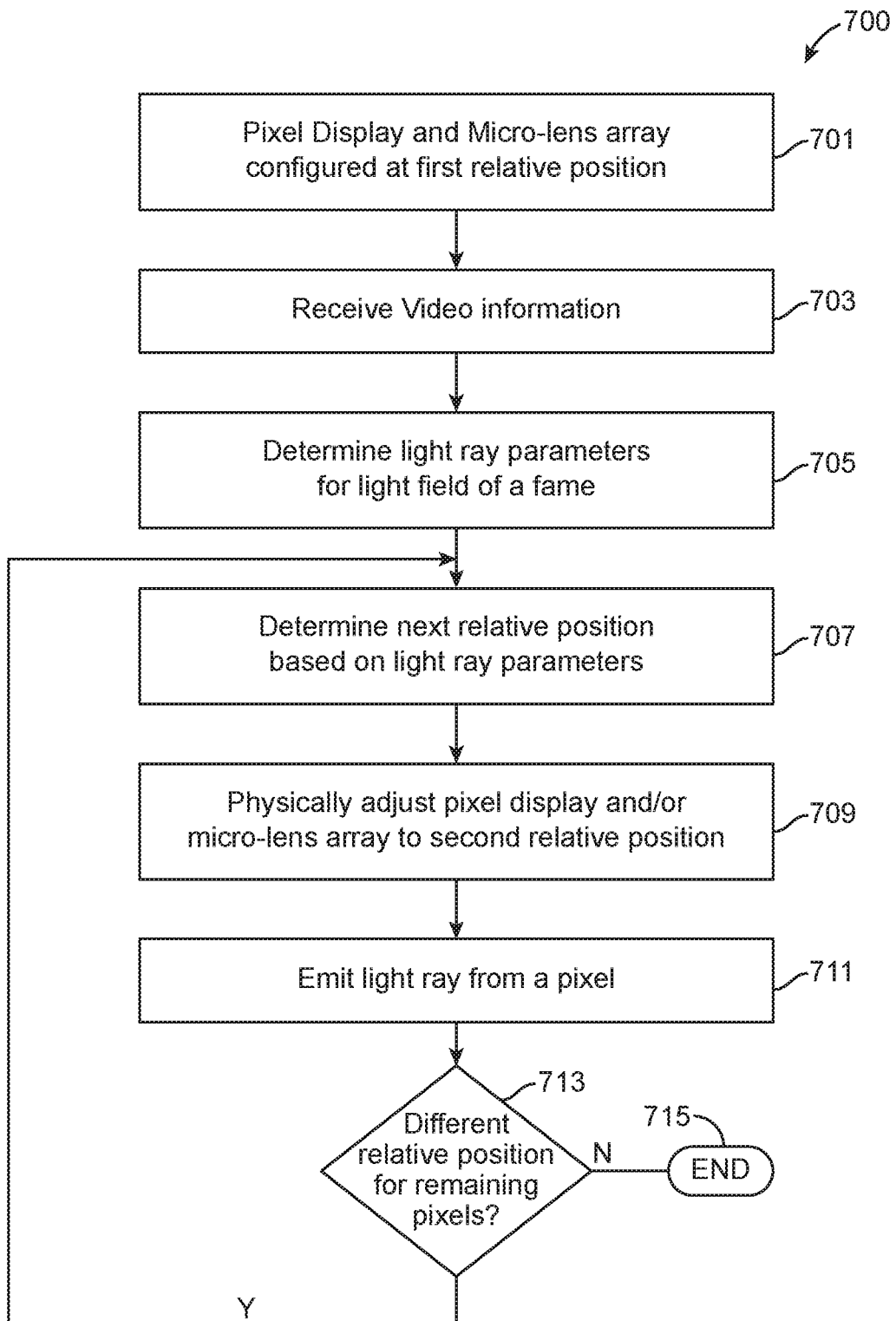
FIG. 7 sets forth a flow diagram of method steps for displaying a light field using the composite display system, according to various embodiments of the present disclosure.

FIG. 7 sets forth a flow diagram of method steps for displaying a light field using the composite display system, according to various embodiments of the present disclosure. Although the method steps are described with reference to the systems of FIGS. 1-5, persons skilled in the art will understand that the method steps can be performed in any order by any system.

Method 700 begins at step 701, where display layer and micro-lens array are configured at a first relative position. In some embodiments, controller 120 may determine the existing position of display layer 112 and/or micro-lens array 114. When in a first configuration at a first relative position, a pixel 204 included in display layer 112 may align with a micro-lens 214 included in micro-lens array 114.

At step 703, controller 120 and/or display device may receive video information. In some embodiments, video source 102 sends video data as video signals to controller 120 and/or display device 110. In embodiments, the video data may include a frame of a video and/or a single image. In some embodiments, the video data may include multiple frames of video.

At step 705, controller 120 determines characteristic parameters for light rays that comprise the target light field 232. Controller 120 implement display parameter module 122 to receive the video data as input and use the video data to determine a set of display characteristic parameters for a set of light rays 206 to flow through target light field 232 within a specified period to reproduce an image included in the video data. In some embodiments, the set of display characteristic parameters includes the incidence angle 404, 504 as a specified characteristic parameter of a light ray in order to reproduce an image.

At step 705, controller 120 determines the next relative position of display layer 112 and/or micro-lens array 114 based on the set of display characteristic parameters for the set of light rays. In some embodiments, controller 120 may implement physical display control module 124 to receive the set of display characteristic parameters as an input. Physical display control module 124 determines the relative positons of display layer 112 and/or micro-lens array 114 necessary for light ray 206 to flow through target light field 232 at the specified incidence angle 404, 504 included in the set of display characteristic parameters.

At step 707, controller 120 causes display device 110 to physically adjust display layer 112 and/or micro-lens array 114 to a second relative position. Upon determining the relative positions of display layer 112 and/or micro-lens array 114 required for display layer 112 to emit a light ray 206 that has the specified display characteristic parameters, physical display control module 124 generates physical control signals to cause physical controller 116 to physically move display layer 112 and/or micro-lens array 114 to the a new configuration with specified relative positions between the two layers of composite display 201.

At step 711, display layer 112 emits a light ray 206 from a specified pixel 204. When composite display 201 is at the specified configuration, display layer 112 causes pixel 203 to emit light ray 206. The light ray 206 emitted by pixel 204 included in display layer 112 propagates through display device 110 and a micro-lens 214 aligned with pixel 204 in the new configuration refracts the light ray 204 to a different angle. The light ray 204 propagates in display device 110 from micro-lens 204 and flow through target light field 232 to the pupil 224 of the user's eye 203 at the angle specified in the set of display characteristic parameters.

At step 713, controller 120 determines whether display device 110 needs to move display layer 112 and/or micro-lens array 114 to a new relative position for any remaining pixels. In some embodiments, controller 120 may cause different pixels included in different frame portions 606, 608, 610 to emit light at different times within a specified period. Controller 120 may determine whether pixels in any of the frame portions 606, 608, 610 remain that need to be emitted. If so, controller 120 returns to step 707, where the controller determines the required configuration for the remaining pixels to emit light rays with the desired characteristics. Otherwise, method 700 ends at step 715.

Figure 8A:
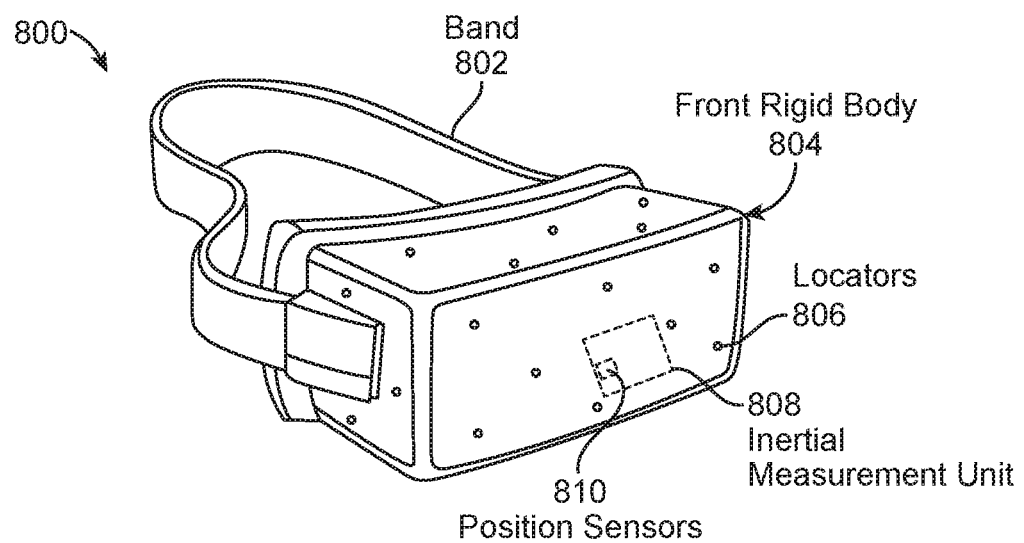
FIG. 8A illustrates a near-eye display (NED) configured to include the composite display system of FIG. 1, according to various embodiments.

FIG. 8A illustrates a near-eye display (NED) 800 configured to include the composite display system of FIG. 1, according to various embodiments. NED 800 includes band 802 and front rigid body 804. Front rigid body 804 includes one or more electronic display elements of an electronic display (not shown), locators 806, inertial measurement unit (IMU) 808, and one or more position sensors 810. In some embodiments, position sensor 810 is located within IMU 808, with neither IMU 808 nor position sensors 810 being visible to the user.

Figure 8B:
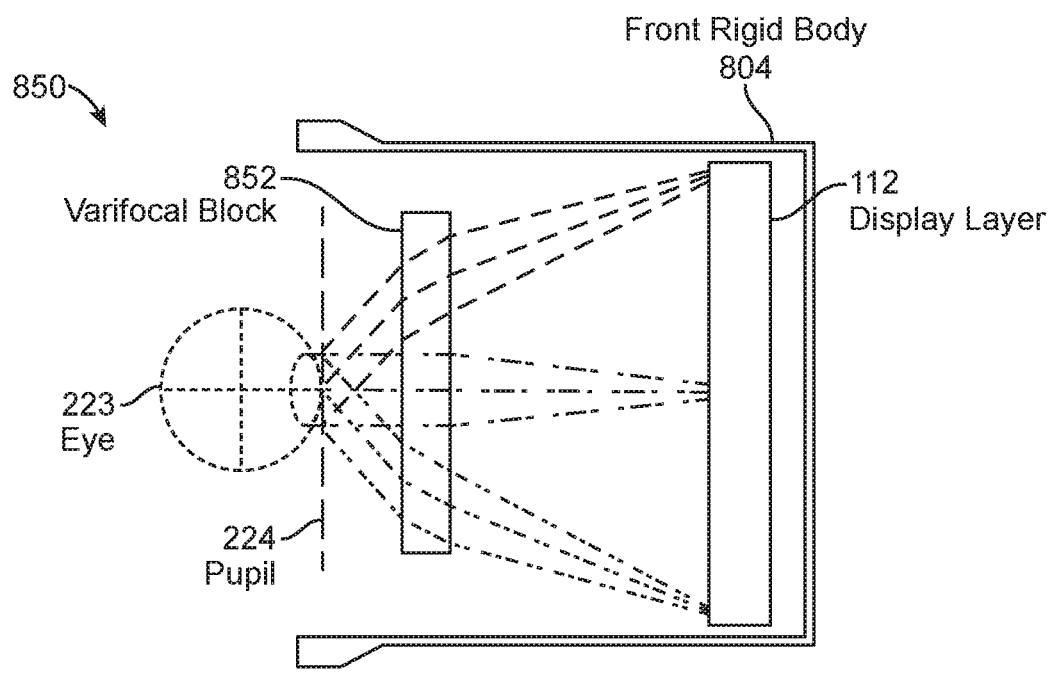
FIG. 8B illustrates a cross-section of the NED, according to various embodiments of the present disclosure.

FIG. 8B illustrates a cross-section of NED 800, according to various embodiments of the present disclosure. Cross section 850 of the front rigid body 804 of front rigid body 804 includes electronic display layer 112 and an optional varifocal block 852 that together may provide light to pupil 224. Pupil 224 is the location of front rigid body 804 where a user's eye 223 is positioned. For purposes of illustration, FIG. 8B shows a cross-section 850 associated with a single eye 223, but another varifocal block (not shown), separate from the varifocal block 852, provides altered image light to another eye of the user.

Display layer 112 displays images to the user. In various embodiments, display layer 112 may comprise a single electronic display or multiple electronic displays (e.g., a display for each eye of a user). Examples of display layer 112 include: a liquid crystal display (LCD), an organic light emitting diode (OLED) display, an active-matrix organic light-emitting diode display (AMOLED), a display including one or more QOLED sub-pixels, a display including one or more QLED sub-pixels, some other display, or some combination thereof.

In some embodiments, varifocal block 852 may adjust an orientation from light emitted from display layer 112 such that it appears at particular focal distances from the user. In some embodiments, varifocal block 852 includes micro-lens array 114.

In sum, the composite display system generates a set of light rays that form a light field in front of a user's eyes. A controller implements a display parameter module to determine target parameters for light rays necessary to generate a video frame. Based on these display parameters, the controller implements a physical display control module to generate control signals that control the configuration of a display layer and a micro-lens array in a display device. A physical controller receives the control signals from the controller and physically moves the display layer and/or micro-lens array to a specified configuration that aligns a subset of pixels with a micro-lens included in the micro-lens array. Based on control signals received from the controller and/or a video signal received from a video source, the display layer causes specific pixels included in the display layer to emit light rays with specified parameters. The specified parameters include a specified radiance that includes a specified color, and one or more emission angles. The light rays emitted from the pixels propagate through space and the micro-lens refracts the light rays. Upon reaching the pupil, the light rays arrive at the pupil at an angle that corresponds to the angle specified in the target parameters generated by the display parameter module. In some embodiments, the controller may move the composite display to a different position such that light rays emitted from pixels in the display arrive at the light field in front of the user's eyes at a different angle.

At least one advantage of the disclosed embodiments is that the composite display system generates a light field in front of the user's eyes that includes reduced distortions due to deviations in the angles that light rays flow through the light field. In addition, the composite display system changes configurations based on individual light rays instead of the entire light field, enabling the light field to retain the individual parameters of individual light rays instead of averaging distortions of individual light rays throughout the entire light field.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

1. In some embodiments, an apparatus comprises a display comprising a plurality of pixels and configured to emit light, and a micro-lens array located adjacent to the display and configured to produce a light field by altering the light emitted by the display, wherein at least one of the display or the micro-lens array is configured to move from a first position to a second position that aligns a first pixel in the plurality of pixels relative to the micro-lens array.

2. The apparatus of clause 1, wherein a first micro-lens included in the micro-lens array refracts a first light ray emitted from the first pixel at a first angle relative to a plane of the micro-lens array.

3. The apparatus of clause 1 or 2, further comprising a controller configured to cause at least one of the display or the micro-lens array to move to the second position.

4. The apparatus of any of clauses 1-3, wherein the controller is further configured to receive at least one parameter associated with a first light ray to be emitted from the first pixel, wherein the controller causes at least one of the pixel display or the micro-lens array to move to the second position based on the at least one parameter.

5. The apparatus of any of clauses 1-4, wherein the controller is further configured to cause a first portion of a frame to display by causing at least one of the display or the micro-lens array to move to the second position to align a first subset of pixels in the plurality of pixels relative to the micro-lens array, wherein the first subset of pixels emits a first set of light rays that refract at the micro-lens array at a first set of frame angles.

6. The apparatus of any of clauses 1-5, wherein the controller is further configured to cause a second portion of the frame to display by causing at least one of the display or the micro-lens array to move from the second position to a third position to align a second subset of pixels in the plurality of pixels relative to the micro-lens array, wherein the second subset of pixels emits a second set of light rays that refract at the micro-lens array at a second set of frame angles.

7. The apparatus of any of clauses 1-6, wherein the first set of light rays arrives at a pupillary axis at a third set of frame angles.

8. The apparatus of any of clauses 1-7, wherein the first pixel comprises a first set of micro-pixels.

9. The apparatus of any of clauses 1-8, wherein a first portion of the first pixel display is configured to move from the first position to the second position without a second portion of the first pixel display moving.

10. In some embodiments, a method, comprises determining a first angle for altering, at a micro-lens array, a first light ray emitted by a display, the micro-lens array configured to produce a light field, and causing at least one of the display or the micro-lens array to move from a first position to a second position associated with the first angle, the second position aligning a first pixel in the display relative to the micro-lens array.

11. The method of clause 10, which further comprises receiving at least one parameter associated with the first light ray, and causing at least one of the pixel display or the micro-lens array to move to the second position based on the at least one parameter.

12. The method of clause 10 or 11, which further comprises causing a first portion of a frame to display by causing at least one of the display or the micro-lens array to move to the second position to align a first subset of pixels in the plurality of pixels relative to the micro-lens array, wherein the first subset of pixels emits a first set of light rays that refract at the micro-lens array at a first set of frame angles.

13. The method of any of clauses 10-12, which further comprises causing a second portion of the frame to display by causing at least one of the display or the micro-lens array to move from the second position to a third position to align a second subset of pixels in the plurality of pixels relative to the micro-lens array, wherein the second subset of pixels emits a second set of light rays that refract at the micro-lens array at a second set of frame angles.

14. The method of any of clauses 10-13, wherein a first portion of the first pixel display moves from the first position to the second position without a second portion of the first pixel display moving.

15. The method of any of clauses 10-14, wherein the first pixel comprises a first set of micro-pixels.

16. The method of any of clauses 10-15, wherein the first set of light rays arrives at a pupillary axis at a third set of frame angles.

17. The method of any of clauses 10-16, wherein a first micro-lens included in the micro-lens array refracts a first light ray emitted from the first pixel at a first angle relative to the plane of the micro-lens array.

18. In some embodiments, a system comprises a wearable device that provides a light field, where the wearables device comprises a display comprising a plurality of pixels and configured to emit light, and a micro-lens array located adjacent to the display and configured to produce the light field by altering the light emitted by the display, and the system also comprises a controller configured to cause at least one of the display or the micro-lens array to move from a first position to a second position that aligns a first pixel in the plurality of pixels relative to the micro-lens array.

19. The system of clause 18, wherein the controller is further configured to cause a first portion of a frame to display by causing at least one of the display or the micro-lens array to move to the second position to align a first subset of pixels in the plurality of pixels relative to the micro-lens array, wherein the first subset of pixels emits a first set of light rays that refract at the micro-lens array at a first set of frame angles.

20. The system of clause 18 or 19, wherein the controller is further configured to cause a second portion of the frame to display by causing at least one of the display or the micro-lens array to move from the second position to a third position to align a second subset of pixels in the plurality of pixels relative to the micro-lens array, wherein the second subset of pixels emits a second set of light rays that refract at the micro-lens array at a second set of frame angles.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An apparatus, comprising:
   a display positioned in parallel to a display plane according to a first configuration, comprising a plurality of pixels, and emitting light;
   a micro-lens array positioned adjacent to the display in parallel to the display plane according to the first configuration and producing a light field by altering the light emitted by the display;
   a physical controller that is coupled to the display or the micro-lens array that extends along the display plane; and
   a controller that receives video signals and generates physical control signals that cause the physical controller to move via bending; wherein the controller;
      determines, based on one or more display characteristics of the light emitted by the display, a second configuration for the display and the micro-lens array, wherein, in the second configuration, (i) at least a portion of the display and the micro-lens array is positioned in parallel to a plane different from the display plane, and (ii) relative positions of the display and the micro-lens array align one or more pixels included in the plurality of pixels relative to one or more micro-lenses included in the micro-lens array according to the one or more display characteristics, and
      generates physical control signals corresponding to the second configuration to cause the physical controller to move,
   wherein at least a portion of one of the display or the micro-lens array is caused to move via bending from the first position to the second position according to the movement of the physical controller.

2. The apparatus of claim 1, wherein the at least a portion of the display or the micro-lens array is caused to move via bending and tilting.

3. The apparatus of claim 1, wherein the at least a portion of one of the display or the micro-lens array is caused to move via bending or tilting according to the movement of the physical controller comprises:

the physical controller performing a first motion on the display to move the display to a first position in the relative positions; and upon performing the first motion, the physical controller performing a second motion on the micro-lens array to a second position in the relative positions.

4. The apparatus of claim 1, wherein:

in the second configuration, a first subset of pixels included in the plurality of pixels is aligned relative to a first subset of micro-lenses included in the micro-lens array, and the first subset of pixels emits a first set of light rays that refract at the micro-lens array at a first set of frame angles to cause a first portion of a frame to be displayed.

5. The apparatus of claim 4, wherein:

the controller causes a second portion of the frame to be displayed by causing at least a portion of one of the display or the micro-lens array to move from the relative positions according to the second configuration to second relative positions according to a third configuration, in the third configuration, a second subset of pixels included in the plurality of pixels are aligned relative to a second subset of micro-lenses included in the micro-lens array, and the second subset of pixels emits a second set of light rays that refract at the micro-lens array at a second set of frame angles.

6. The apparatus of claim 4, wherein the first set of light rays arrives at a pupillary axis at a third set of frame angles.

7. The apparatus of claim 1, wherein the one or more pixels comprise a first set of micro-pixels.

8. The apparatus of claim 1, wherein a first portion of the display moves via bending or tilting according to the movement of the physical controller without a second portion of the display moving.

9. The apparatus of claim 1, wherein a first micro-lens included in the micro-lens array refracts a first light ray emitted from a first pixel included in the plurality of pixels at a first angle relative to the display plane.

10. A system, comprising:

a display positioned in parallel to a display plane according to a first configuration, comprising a plurality of pixels, and emitting light;

a micro-lens array positioned adjacent to the display in parallel to the display plane according to the first configuration and producing a light field by altering the light emitted by the display;

a physical controller that is coupled to the display or the micro-lens array that extends along the display plane; and a controller that receives video signals and generates physical control signals that cause the physical controller to move via bending; wherein the controller;

determines, based on one or more display characteristics of the light emitted by the display, a second configuration for the display and the micro-lens array, wherein, in the second configuration, (i) at least a portion of the display and the micro-lens array is positioned in parallel to a plane different from the display plane, and (ii) relative positions of the display and the micro-lens array align one or more pixels included in the plurality of pixels relative to one or more micro-lenses included in the micro-lens array according to the one or more display characteristics, and generates physical control signals corresponding to the second configuration to cause the physical controller to move, wherein at least a portion of one of the display or the micro-lens array is caused to move via bending from the first position to the second position according to the movement of the physical controller.

11. The system of claim 10, wherein the at least a portion of one of the display or the micro-lens array is caused to move via bending or tilting according to the movement of the physical controller comprises:

the physical controller performing a first motion on the display to move the display to a first position in the relative positions; and upon performing the first motion, the physical controller performing a second motion on the micro-lens array to a second position in the relative positions.

* * * * *